United States Patent [19]
Brief

[11] Patent Number: 5,465,250
[45] Date of Patent: Nov. 7, 1995

[54] HYBRID LOOPBACK FOR FDDI-II SLAVE STATIONS

[75] Inventor: David C. Brief, Palo Alto, Calif.

[73] Assignee: National Semiconductor Corporation, Santa Clara, Calif.

[21] Appl. No.: 83,111

[22] Filed: Jun. 24, 1993

[51] Int. Cl.$^6$ .............................. H04L 12/42; H04L 12/64
[52] U.S. Cl. ................... 370/15; 370/17; 370/85.14; 370/108; 371/20.6; 371/20.5
[58] Field of Search ............................. 370/13, 16, 16.1, 370/17, 15, 60, 60.1, 85.14, 85.15, 94.1, 94.2, 108; 371/201.1, 20.2, 20.4, 20.5, 20.6, 8.2, 8.1, 11.1, 11.2

[56] References Cited

U.S. PATENT DOCUMENTS

| | | | |
|---|---|---|---|
| 5,023,872 | 6/1991 | Annamalai | 371/20.6 |
| 5,179,664 | 1/1993 | Li et al. | |
| 5,185,863 | 2/1993 | Hamstra et al. | |
| 5,278,824 | 1/1994 | Kremer | 371/20.6 |
| 5,282,199 | 1/1994 | Herzberg et al. | 370/85.14 |
| 5,307,353 | 4/1994 | Yamashita et al. | 371/20.5 |
| 5,331,642 | 7/1994 | Valley et al. | 371/8.2 |
| 5,339,317 | 8/1994 | Tanaka et al. | 370/16.1 |

OTHER PUBLICATIONS

National Semiconductor's *Fiber Distributed Data Interface Designer's Guide*, No. 103751, 1990 Edition, Santa Clara, Calif.

National Semiconductor's *Desktop FDDI Handbook*, No. 550137, 1992 Edition, Santa Clara, Calif.

*FDDI Physical Layer Protocol (PHY–2), Draft Proposed American National Standard* (ANSI), Rev. 5, Jun. 17, 1992.

*FDDI Hybrid Ring Control (HRC), Draft Proposed American National Standard* (ANSI), Rev. 6.2, May 28, 1992.

*Primary Examiner*—Wellington Chin
*Attorney, Agent, or Firm*—Skjerven, Morrill, MacPherson Franklin & Friel; Paul J. Winters; David T. Millers

[57] ABSTRACT

Embodiments of the present invention provide methods and circuits for testing the hybrid capabilities of a station before the station is connected into an FDDI-II hybrid ring. One embodiment tests hybrid mode operation of an FDDI-II non-monitor station by creating a loopback ring, generating cycles for isochronous transmission on the loopback ring, and measuring the progress of the cycles around the loopback ring. The loopback ring created may be internal to a single integrated circuit, internal to a single slave station, or limited to a pair of stations, such as a concentrator and a single attachment station. Another embodiment provides a circuit for use in station on an FDDI-II ring. The circuit includes a loopback circuit which may be configured to create a hybrid ring and a cycle generator for generating cycles on the hybrid ring. The cycle generator includes a small latency adjustment buffer (LAB) and a limited isochronous media access control unit (IMAC) which are incapable of cycle master operation but are sufficient to provide test cycles.

33 Claims, 7 Drawing Sheets

HYBRID LOOPBACK FOR FDDI-II SLAVE STATIONS

CROSS-REFERENCES TO RELATED APPLICATIONS

This application is related to, and incorporates by reference, the following U.S. patent applications filed on the same date as the present application: application Ser. No. 08/082,678, entitled "Method and Apparatus for Trace Propagation in a Ring Network" filed by David C. Brief, Robert L. Macomber and James R. Hamstra, attorney docket no. NS-2206; application Ser. No. 08/082,193, entitled "Elasticity Buffer Control Method" filed by James R. Hamstra and David C. Brief, attorney docket no. NS-2209; application Ser. No. 08/083,963, entitled "Intelligent Repeater Functionality" filed by David C. Brief, James R. Hamstra, and Gregory L. DeJager, attorney docket no. NS-2211; and application Ser. No. 08/083,591, entitled "Link Error Monitoring" filed by David C. Brief, James F. Torgerson, and James R. Hamstra, attorney docket no. NS-2212.

BACKGROUND OF THE INVENTION

1. Field of the Invention

This invention relates to digital data communications and, in particular, to methods and circuits for testing hybrid mode operation of a station in a Fiber Distributed Data Interface (FDDI-II) network.

2. Description of Related Art

FDDI (Fiber Distributed Data Interface) and FDDI-II are American National Standard (ANS) protocols for 100 Mbit/s Local Area Networks (LANs). Both protocols, FDDI and FDDI-II, are implemented on ring networks having stations which communicate over fiber optic cables.

Figure 1:
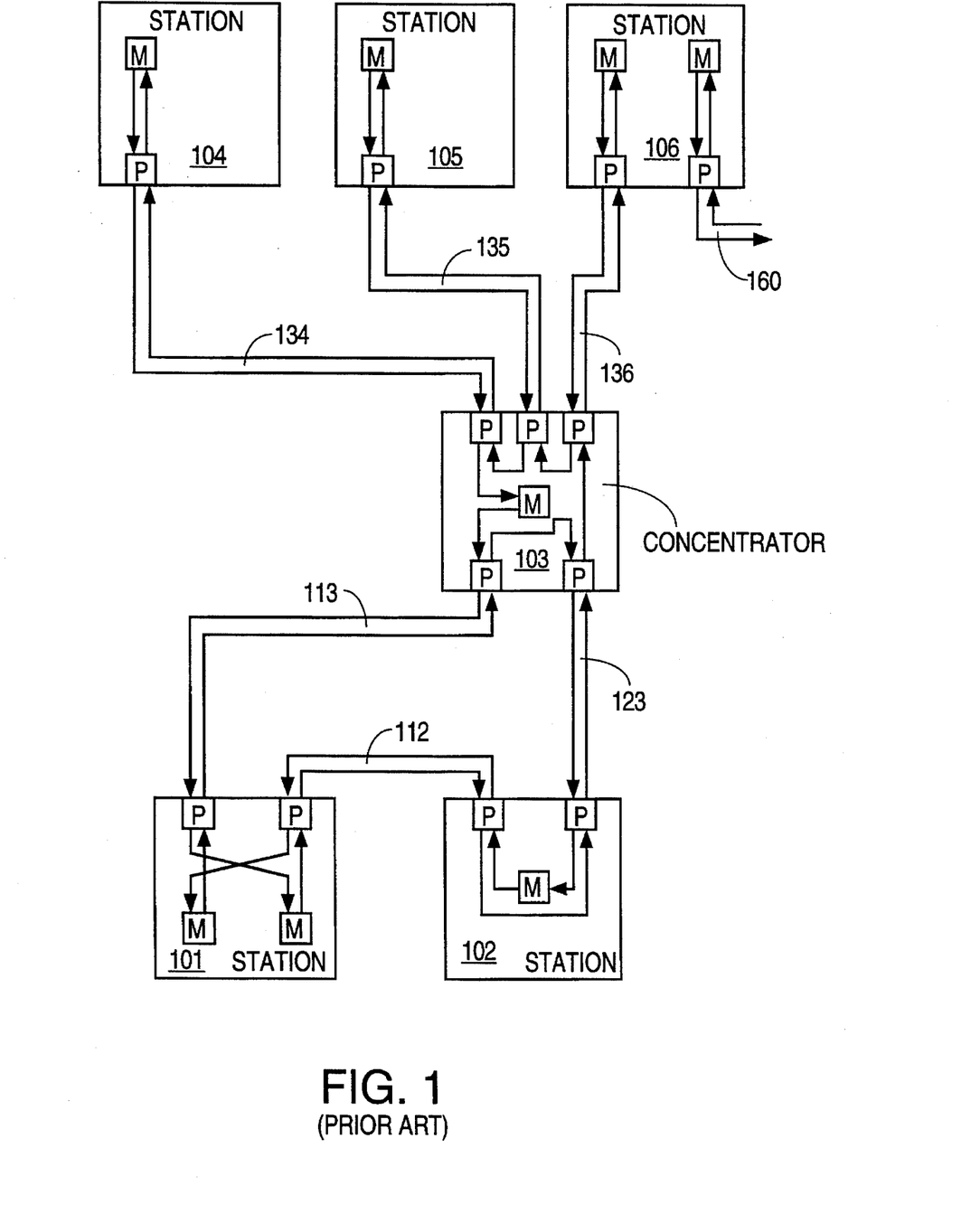
FIG. 1 shows an example of an FDDI or FDDI-II network.

FIG. 1 shows an example of an FDDI or FDDI-II network. The network has a trunk ring which consists of a pair of counter-rotating rings. Data travel clockwise in one ring and counterclockwise in the other. The trunk ring is formed using dual fiber optic cables 112, 123, and 113 which connect stations 101, 102 and 103.

Each station 101–106 has at least one physical layer P which comprises Physical Layer Medium Dependent (PMD) device such as a fiber optic transceiver which converts light signals to electric signals and converts electric signals back to light signals and a physical protocol device (PHY) which implements FDDI or FDDI-II protocols. Each station also has at least one Media Access Control (MAC) interface M which processes data received by a physical layer P and which provides data to be transmitted by a physical layer P. In the example shown in FIG. 1, stations 101 and 102 communicate over the clockwise rotating ring. Station 103 does not have a MAC which receives data over from the clockwise rotating ring, and therefore acts as a repeater on the clockwise rotating ring.

All stations connected directly to the trunk ring must maintain counter-rotating rings and therefore must have at least two PHY units. Single attachment stations, stations with only one PHY unit such as 104 and 105, can not be connected directly to the trunk ring, and must access the trunk ring through another station, such as station 103. A station, like station 103, which connects other stations into a trunk ring is referred to as a concentrator.

In the example ring shown in FIG. 1, stations 104, 105, and 106 are connected through concentrator 103 to the counterclockwise rotating ring. For the purposes of the rings shown, the station 106 acts as a single attachment station. However, station 106 can attach to another ring (not shown) via dual fiber optic cable 160.

FDDI provides protocols for a token ring network which transmits data packets. The data packets are made up of a variable number of 5-bit symbols. Of the 32 possible values for a 5-bit symbol, 16 values represent 4-bit data (numbers from 0 to 15), 8 values represent control signals, and 7 values represent violation symbols. Violation symbols are not used because they violate code run length and dc balance requirements.

Stations in the token ring only originate data packets after capturing a token which indicates the right to transmit. FDDI provides rules which control access to a ring by controlling when a station may capture a token. Two priorities of access are defined, "synchronous" and "asynchronous."

Every transmitted packet contains a header which indicates source and destination stations. The packets travel around the ring by being received and retransmitted by successive stations in the ring. Stations which are destination stations process the data and may alter the data packet before retransmitting.

FDDI-II enhances FDDI by allowing formation of a hybrid ring which provides both data packet service (synchronous and asynchronous service) and cycle-switched service (isochronous service). A hybrid ring is made up of two types of stations, monitor stations and non-monitor stations. Monitor stations are capable of acting as the cycle master for the hybrid ring. Non-monitor stations are only capable of being a slave station. The hybrid ring requires one monitor station to act as cycle master. All other stations in the ring, both monitor stations and non-monitor stations, are slave stations.

Figure 2:
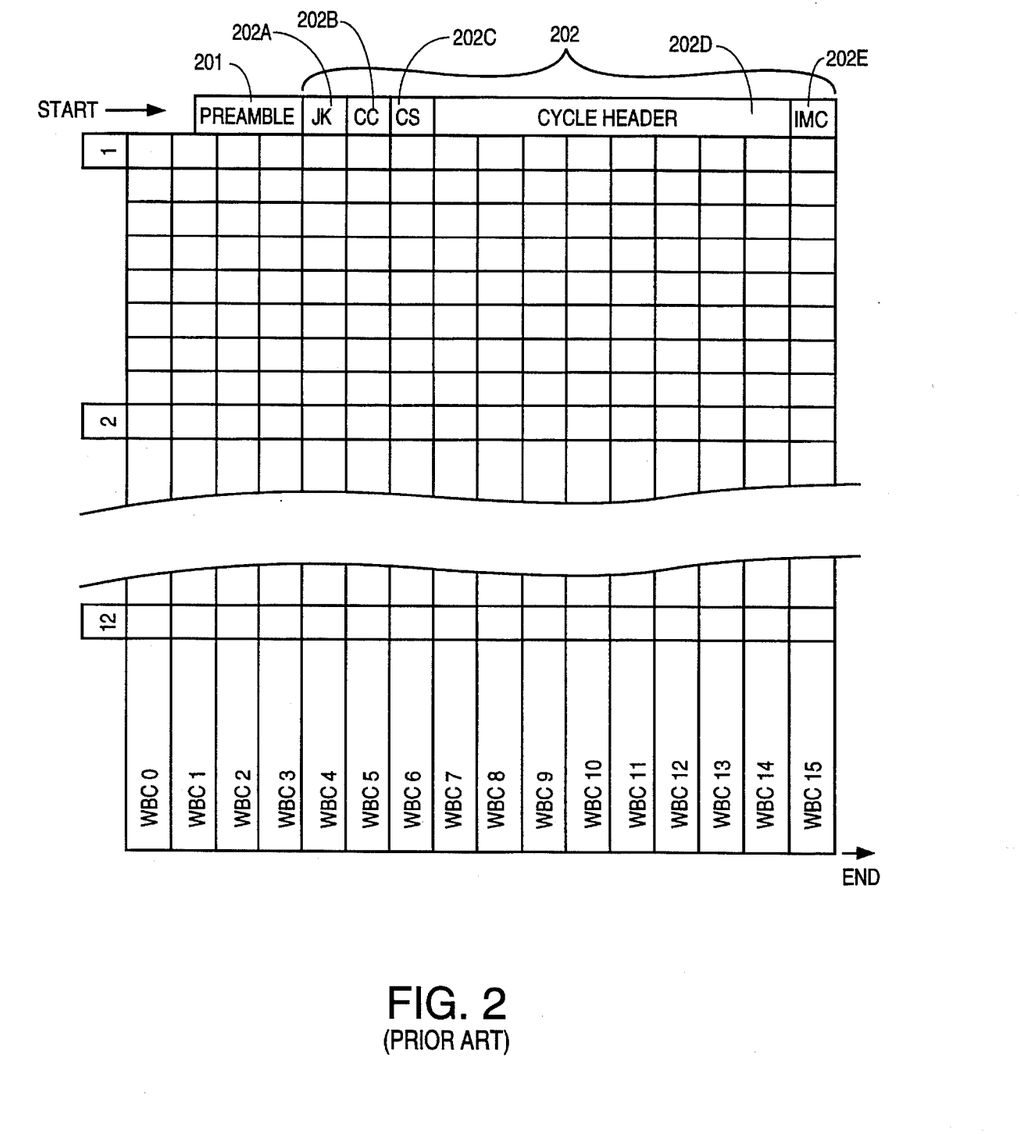
FIG. 2 shows a the cycle structure defined by the FDDI-II protocol.

The cycle master produces a continuous serial bit stream of 5-bit symbols which are organized in cycles. According to the clock of the cycle master, once every 125 µs, the cycle master begins a new cycle which is 125 µs long. Each 125 µs cycle has time slots for 1560 bytes (3120 symbols) and is preceded by a 2.5 byte preamble. Slots within a cycle are identified by timing. FIG. 2 shows the FDDI-II cycle structure. The slots are organized into 16 Wide Band Channels (WBCs) WBC 0–WBC 15 having 96 bytes size slots each, 12 byte size slots 1–12 dedicated for packet service, 2.5 bytes (5 symbols) for a preamble 201, and 12 bytes a header 202.

The cycle starts with preamble 201 and header 202 which are followed by slots for data. The header 202 is divided into fields, JK starting delimiter field 202A, cycle control field 202B, cycle sequence field 202C, programming template 202D, and isochronous maintenance channel field 202E. Wide band channels WBC 0–WBC 15 may be allocated either for packet or isochronous service. Programming template 202D indicates the allocation of each wide band channel WBC 0–WBC 15. Dedicated packet service slots 1–12 are only used for packet service. Accordingly, the hybrid ring provides a minimum of 768 kbit/sec (12 bytes/125 µs) for packet service. The order of transmission in FIG. 2 is left to right starting with the top row. Thus, dedicated packet service slots 1–12 and byte sized slots of the wide band channels WBC 0 through WBC 15 are interleaved.

Isochronous service is a type of transmission that depends on identification of particular bits in a cycle. With isochronous service, N bits beginning with byte slot M in WBC number X can be allocated for isochronous transmission between particular stations on the hybrid ring. Once slots are allocated, a source station can insert information into the allocated slots and destination station can retrieve the information when the allocated slots arrive. Packet headers are not required. Isochronous service provides regular transmissions that have a well controlled rate of transfer, regardless of the work load on the ring. A 1-bit slot allocated for isochronous service provides one bit of information every 125 μs or an 8 kbit/s transmission rate. Larger allocations provide faster rates.

The cycle master is responsible for generating a preamble and header at the beginning of each cycle, maintaining the timing of the cycle, and negotiating allocation of WBCs and slots of the WBCs.

Figure 3:
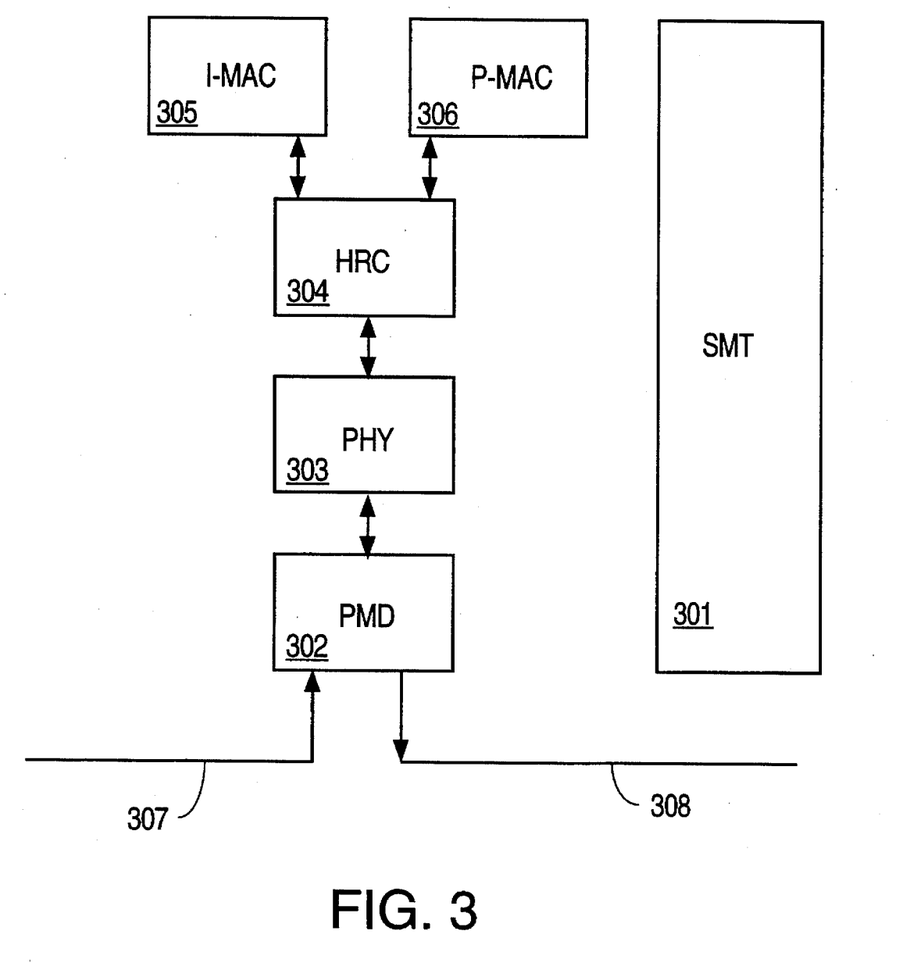
FIG. 3 shows a block diagram of the logical units which are part of a station which operates under FDDI-II protocol.

FIG. 3 shows the functional units in a station which implements the FDDI-II protocol. A PMD unit 302 couples to fiber optic cables 307 and 308 and to PHY unit 303. PMD 302 converts light signals coming in on cable 307 to electrical signal which can be used by PHY 303. PMD 302 also converts electric signals from PHY 303 to light signals transmitted on cable 308. PHY 303 connects to an Hybrid Ring Control (HRC) unit 304 which routes signals to and from two types of Media Access Control (MAC). A Packet MAC (PMAC) 306 handles packet service and operates as described above. Accordingly, the PMAC handles data as transmissions on a token ring. An Isochronous MAC (IMAC) 305 handles data from the slots allocated for isochronous transmission.

Cycles travel around the ring and return to the cycle master. Along the way slave stations may insert packet and isochronous data into slots. Packet data received by the cycle master is inserted into the next available slot allocated for packet service. Isochronous data is treated differently. Typically, the time to travel around the ring will not be a multiple of 125 μs, so if isochronous data were immediately repeated or transmitted by the cycle master the isochronous data would not be in the correct slot. The cycle master uses a Latency Adjustment Buffer (LAB) to delay transmission of isochronous data until the proper time slot in a cycle. To avoid loss of data, the LAB must be able to hold an entire cycle of isochronous data.

One problem with non-monitor FDDI-II stations is testing hybrid mode capabilities. Hybrid mode capabilities of monitor stations can be tested before insertion into a hybrid ring by having the monitor station operate a local ring (a small test ring). Prior art non-monitor stations can not operate a hybrid local ring and their hybrid mode capabilities cannot be tested in a local ring unless the ring includes a monitor station. After insertion into the working hybrid ring, malfunctioning stations must be identified, removed from the ring, and a new hybrid ring established. Connecting the malfunctioning station to a ring can cause data transmission problems and delays.

Testing is also a problem when different types of station are connected to a concentrator. A concentrator should not connect stations that are not capable of operating in hybrid mode into a hybrid ring. Methods of testing are needed which test the hybrid functions of a station, both internally for malfunctions and externally for FDDI-II compatibility, before inserting the station into a hybrid ring.

SUMMARY OF THE INVENTION

Embodiments of the present invention provide methods and circuits for testing the hybrid services of a station before the station is connected into an FDDI-II hybrid ring.

One embodiment of the invention tests hybrid mode operation of an FDDI-II non-monitor station by creating a loopback ring, generating hybrid mode cycles on the loopback ring, and measuring the progress of the cycles around the loopback ring. The loopback ring created may be internal to a single integrated circuit, internal to a single non-monitor station, or can contain more than one station.

In some embodiments, signals for isochronous transmission are generated with a cycle generator. The cycle generator typically includes a latency adjustment buffer capable of holding less than a full cycle of isochronous data. An LAB capable of holding only two bytes, a packet byte and an isochronous byte, is sufficient. The cycle generator generates isochronous data signals or test cycles that travel around the loopback ring.

Another embodiment of the present invention provides a testing circuit for use in stations on an FDDI-II ring. The testing circuit includes a cycle generator which holds less than a full cycle of isochronous data and a loopback circuit which may be configured to create a loopback ring.

In some embodiments, the testing circuit is part of an integrated circuit. Typically, the loopback circuit is capable of forming loopback rings which are internal to the integrated circuit, internal to a slave station containing the integrated circuit, or which include more than one station, such as a single attachment station and a concentrator.

The circuit would also typically include a receiver, a transmitter, and a latency adjustment buffer which holds less than a full cycle of isochronous data, for example, holding only two bytes. Often, the cycle generator has a programmable cycle preamble length for testing smoothing in the loopback ring. Typically, the circuit also includes circuitry for injecting error codes into cycle headers.

Another embodiment of the invention is a non-monitor station which includes a loopback circuit and a cycle generator.

Other features and advantages of the inventions are described below.

DETAILED DESCRIPTION OF THE PREFERRED EMBODIMENTS

Figure 4:
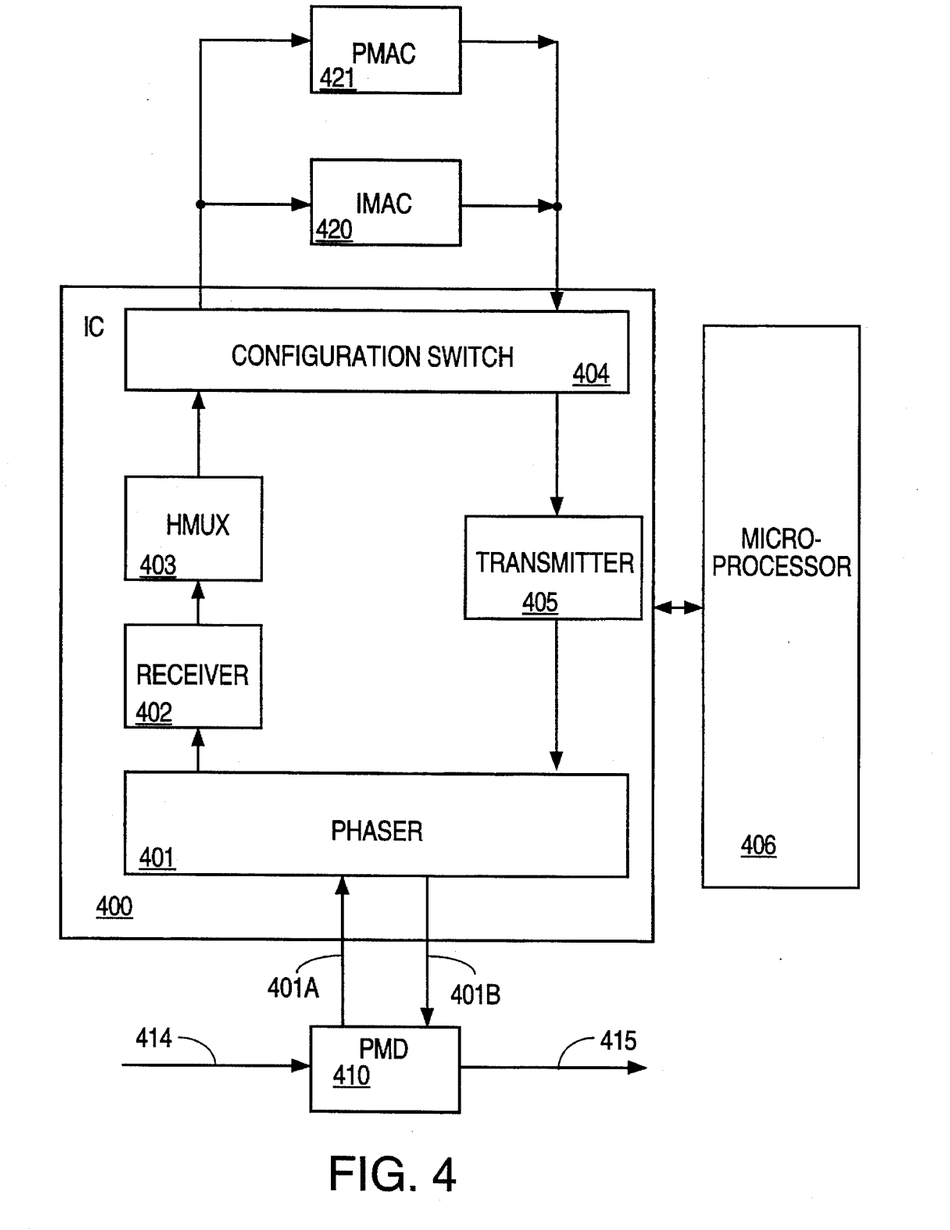
FIG. 4 shows a block diagram of a part of a station according to one embodiment of the present invention.

FIG. 4 shows a block diagram of part of an FDDI-II non-monitor station. Integrated circuit (IC) 400 comprises several functional blocks including phaser 401, receiver 402, HMUX 403, configuration switch 404, and transmitter 405. IC 400 provides PHY and HRC functionality. IC 400 is connected to a PMD 410, an IMAC 420, a PMAC 421, and a microprocessor 406.

Although FIG. 4 shows the IC 400 connected to IMAC 420, more generally, any sort of isochronous termination device may replace the IMAC 420. In particular, a circuit switched device or a CODEC may be used in place of IMAC 420.

Further, the organization of functional blocks is only an example. Alternatively, PMD 410, IMAC 420, or PMAC 421 may be integrated on IC 400, or the functional blocks within IC 400 may be separated and placed on a number of chips without effecting the operation of the station.

Phaser 401 produces clocking signals for the station and provides a data stream to receiver 402. Phaser 401 accepts or transmits a 125 Mbit/sec data stream through input and output leads 401A and 401B respectively. (Because 5-bit symbols are used to encode 4 bits of data, the maximum data transfer rate is 100 Mbit/sec.) Phaser 401 synchronizes the bit stream with an internal 125 MHz clock. In normal operation, phaser 401 provides the synchronized data stream to receiver 402. Phaser 401 can also route a data stream from transmitter 405 to receiver 402, for testing.

Receiver 402 detects a preamble which indicates the start of a packet or a cycle depending on whether the station is in basic FDDI mode or in hybrid mode. Receiver 402 decodes (and if necessary descrambles) 5-bit symbols and identifies link errors or violation symbols. When no errors are found, receiver 402 converts pairs of valid serial 5-bit symbols into data or code bytes, and transmits data or code bytes to HMUX 403.

HMUX 403 performs the HRC functions of an HMUX slave device as defined in the FDDI Hybrid Ring Control American National Standard. The HMUX processes the data and generates tag codes which indicate whether data bytes are processed by a Packet MAC 421 or an Isochronous MAC 420 or repeated (sent to transmitter 405 and not used by the station). The HMUX 403 transmits the data and tag codes to configuration switch 404.

The non-monitor station does not contain a latency adjustment buffer sufficient to permit the station to become cycle master in an FDDI-II hybrid ring. However, HMUX 403 does contain a mini-LAB and performs a limited IMAC function sufficient for testing hybrid operations, as described in more detail below.

Configuration switch 404 routes data. Configuration switch 404 may be configured to route data from HMUX 403 to the external IMAC 420 and/or PMAC 421 or from HMUX 403 directly to transmitter 405. When configuration switch 404 is configured to transmit to IMAC 420 and PMAC 421 both data and tag codes are transmitted. IMAC 420 and PMAC 421 can use the tag codes to determine if the data should be processed, ignored, or repeated. Output data from IMAC 420 and PMAC 421 is then routed back to configuration switch 404. Configuration switch 404 routes data from the IMAC 420 and/or PMAC 421 to transmitter 405.

Transmitter 405 converts data bytes into 5-bit symbols, generates control symbols as required, and performs a parallel to serial conversion. In normal operation, transmitter 405 provides a 125 Mbit/sec serial bit stream to phaser 401. The bit stream is transmitted to PMD 410 via output lead 401B. For testing, the bit stream can be directed through a loopback path in phaser 401 to receiver 402. Multiple alternative loopback paths may be provided within phaser 401 to permit testing of different features of phaser 401.

In hybrid test mode, a closed ring is formed. The ring can be formed entirely inside IC 400. For example, one ring provides a data path from HMUX 403 through configuration switch 404 through transmitter 405 through receiver 402 back to the HMUX 403. Other rings can be formed entirely inside the station, for example, a ring that is the same as above except that configuration switch 404 routes the data from HMUX 403 to IMAC 420 or PMAC 421 then back through configuration switch 404 to the transmitter 405.

Microprocessor 406 controls operation of IC 400. In particular, microprocessor 406 can execute a testing program and write to registers (not shown) of IC 400 to configure the loopback ring and control generation of test isochronous signals.

A hybrid loopback ring (a small FDDI-II network) can be established within the station using a cycle generator which produces isochronous data signals or FDDI-II cycles in either example ring. The cycles can be observed to determine if the functional blocks in the loopback ring perform properly. This permits testing of hybrid service capabilities before connecting a station to an actual hybrid loop. Monitor station capabilities could be used for this testing. However, providing full monitor station capabilities in a slave station is expensive and unnecessary for testing.

Figure 5A:
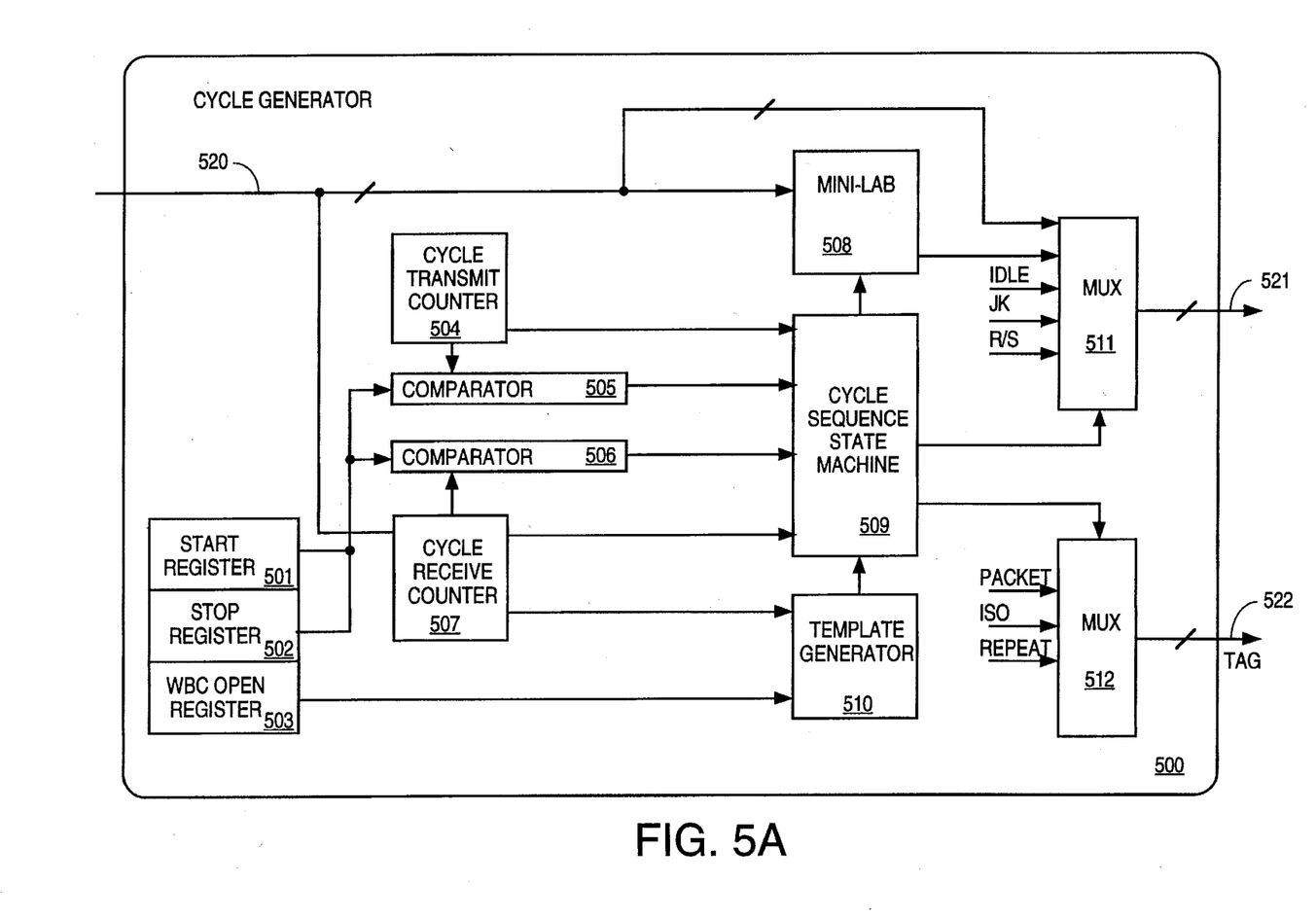
FIG. 5A shows a block diagram of a cycle generator according to one embodiment of the present invention.

FIG. 5A shows a block diagram of a cycle generator 500 sufficient for testing hybrid operation. In some embodiments, cycle generator 500 is part of HMUX 403, shown in FIG. 4. In other embodiments, cycle generator 500 is located elsewhere in the loopback ring.

The cycle generator 500 generates test cycles and tag codes according to values stored in start register 501, stop register 502, and WBC open register 503. The registers 501–503 may be set by a microprocessor according to a testing program used during test mode or according to channel allocation during hybrid operation mode. WBC Open register 503 indicates the WBCs that are used by this station. Sixteen bits in WBC Open register 503 indicate if the sixteen WBCs are open or not. The start register 501 indicates the first byte in the open WBCs that is allocated to this station, while the Stop register indicates the last byte allocated to this station. With these three registers 501–503 the same range slots in every open WBC must be used by the station.

A cycle sequence state machine 509 controls the production of cycle bytes on lines 521 and tag codes on line 522. As described above, cycle bytes and tag codes are routed through a configuration switch.

At the start of each cycle, a preamble must be generated. State machine 509 sends a control signal to multiplexer 511 which causes multiplexer to select an IDLE signal as output. State machine 509 contains a register which determines how many bytes of preamble are generated. The number of preamble bytes can alternate between two and three bytes to provide an average of 2.5 bytes and correct timing, or the number of bytes can be selected to test smoother functionality. (HMUX 403 and transmitter 405 include smoothers that adjust the preamble.) For example, if the preamble was set to 2 bytes, the time period of a cycle would be constantly short by half a byte. Eventually, timing glitches will develop unless the short cycles are corrected for by smoothing functionality. Returned cycles can be observed to see if timing is corrected by circuitry in the loopback ring.

After the preamble, a cycle header is generated. Template generator 510 supplies state machine 509 with a programming template which describes the allocation of WBCs. During testing, a fixed template is used that allocates all WBCs to isochronous data. State machine 509 sends signals to multiplexer 511, which cause the multiplexer to select a start symbol JK then select the correct combination of R and S symbols to create a cycle header.

The data generated by the cycle generator 500 is supplied either by a miniature latency adjustment buffer (LAB) 508, by an input line 520, or set to a constant value such as an IDLE signal. LAB 508 delays packet data and isochronous data into the appropriate time slots. LAB 508 is a two-byte buffer which contains a packet byte and an isochronous byte. Data may be written into the buffer from the input line 520 at any time but data is only sent from the buffer during the appropriate time slots. Since the mini-LAB 508 contains only one byte for each type of data, data must be read out before new data is written in, if loss of data is to be prevented. A larger buffer could be used but is unnecessary, because while a cycle master must be able to preserve data created by other stations, test data cycles are generated as needed and generally do not need to be preserved. Alternatively, the isochronous slots of interest during testing may be limited to one slot per cycle.

During generation of a cycle, a cycle transmit counter 504 increments to keep track of the last slot transmitted. A cycle receive counter 507 increments as bytes are received on the input line 520. State machine 509 selects whether the current time slot being transmitted contains packet data or isochronous data and causes the mini-LAB 508 to send the correct byte to multiplexer 511. State machine 509 cause the multiplexer 511 to select the byte from mini-LAB 508 only if the current slot is between the value held in start register 501 and the value held in stop register 502 for an open channel as indicated by WBC register 503. Comparator 505 is used to determine if the current slot is within the desired range. Otherwise, an IDLE byte can be selected.

Packet bytes coming into the cycle generator 500 on input line 520 are written into the packet byte of mini-LAB 508. Isochronous bytes coming into the cycle generator 500 on input line 520 are written into the isochronous byte of the mini-LAB 508 only if they are within the range indicated by registers 501 and 502 and in a WBC that register 503 indicated is open. Comparator 506 is used to determine if bytes are within the desired range. If the desired range is only one isochronous byte and the time to travel around the loopback ring is less than 125 µs then isochronous data can be repeated around the ring without loss.

Simultaneous with generation of bytes from multiplexer 511, multiplexer 512 produces tag codes which indicate whether the current slot is packet data, isochronous data for this station, or data that should be repeated. Tag codes are values which are provided with the data bytes and which determine how bytes are handled. (Many code schemes are possible. For example, 2-bit tag codes 01, 10, and 11 respectively indicate the PMAC should process the byte, the IMAC should process the byte, and the byte is not for use by this station and should be repeated unchanged.)

Figure 5B:
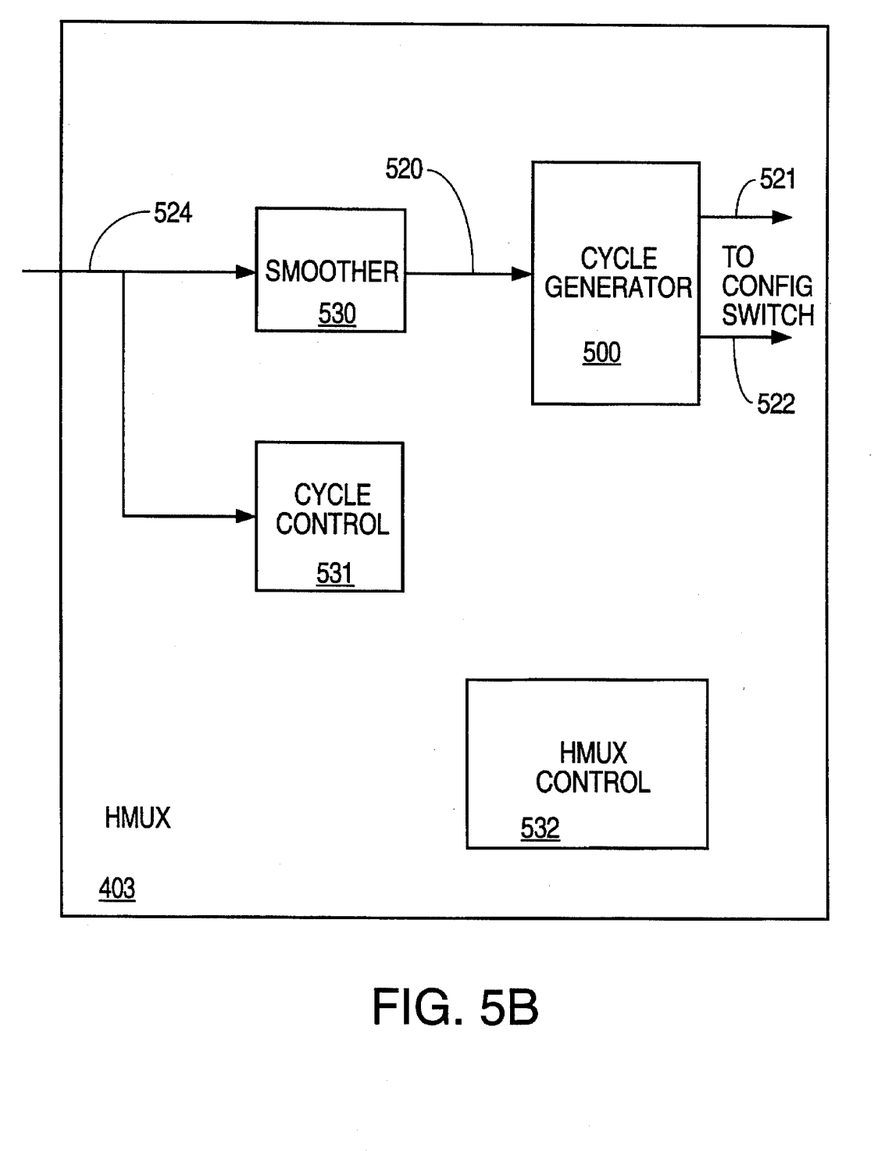
FIG. 5B shows a block diagram of an HMUX containing a cycle generator according to one embodiment of the present invention.

FIG. 5B shows a block diagram of cycle generator 500 and related functional units inside HMUX 403. Elements in FIG. 5B that are like elements in previous figures are given the same reference numbers. Generated cycles that travel around a loopback ring are fed into HMUX 403 on lines 524 and are transmitted through a smoother 530. Smoother 530 adds or deletes preamble bytes if necessary to correct the timing of a cycle. The cycles are then transferred to cycle generator 500 which operates as described above. Cycles from the input line 524 are also fed to a cycle control unit 531 which determines the state of the loopback ring from the returning cycles. Cycle control unit 531 performs the functions specified for cycle control units in the FDDI HRC standard. HMUX control unit 532 can be used to check the state of the ring and determine if an error occurred during testing.

Functions provided by the cycle generator permit testing of hybrid functions, as described above, but parts of the cycle generator can also be used during normal hybrid mode operation. During normal hybrid mode operation, a programming template is provided in the cycle header from the cycle master. The cycle header information may be provided to the state machine 509. A microprocessor can be used to set the values of the start register 501, stop register 502, and WBC Open register 503 according to byte allocations within the WBCs. Cycle generator 500 will then generate tag codes for actual rather than test cycles.

Accordingly, cycle generator 500 provides circuitry in an HMUX that provides functions typically only found in an IMAC. Such circuitry amounts to a mini-IMAC. In the prior art, the generation of tag codes at a granularity finer than WBCs was not handled in an HMUX, and the HMUX did not contain IMAC functions. An external IMAC was responsible for determining which bytes were allocated by a channel allocator.

Providing IMAC functions in a cycle generator in an HMUX permits testing simply by configuring the cycle generator. Test channel allocations do not need to be stored in an external IMAC. In addition, the external IMAC can be simplified in limited isochronous applications where the tag bytes generated by the cycle generator are sufficient.

Referring again to FIG. 4, cycles containing isochronous data from the cycle generator in HMUX 403 are transmitted to configuration switch 404. Configuration switch 404 routes the data directly to transmitter 405 (along a shorter loopback ring) or through IMAC 420 or PMAC 421 back though configuration switch 404 then to transmitter 405 (along a longer loopback ring). The routing of signals will depend on the loopback ring chosen. The longer loopback ring permits testing of IMAC 420 and PMAC 421, while the shorter loopback ring tests only elements in IC 400.

Transmitter 405 converts the data to 5-bit symbols then to a serial bit stream. Transmitter 405 can transmit data values without change or can inject violation symbols into the stream. U.S. Pat. No. 5,072,447 to Perloff et al entitled "PATTERN INJECTOR" which is incorporated herein by reference in its entirety, describes a pattern injector which may be included in transmitter 405.

Injecting violation symbols tests how this station or a remote station handles errors. For example, cycle headers must follow the FDDI-II format. A station that is hybrid mode capable will check for the correct format and make changes when errors are found. If changes are not made, a station is not hybrid mode capable.

Symbols from transmitter 405 can be routed through phaser 401 to receiver 402. Routing through the phaser 401 permits testing of the operation of phaser 401. Receiver 402 converts the bit stream back to data bytes and detects violation symbols. The data bytes are transmitted to HMUX 403.

Several checks can be used to determine if the loopback ring is operating properly. The HMUX can determine if any data travels all the way around the loopback ring. The returned cycle bytes can be compared to expected values to determine if the elements in the loopback ring operated without errors. The receiver can be monitored to see if violation symbols are detected. The travel time around the loopback ring can also be measured to determine if performance is suitable (travel time must be less than 125 µs for isochronous data and less that 10.24 μs for packet data to avoid overwriting data in the mini-LAB). If errors are detected or the travel time is not suitable, the station is malfunctioning. Varying the data path of the loopback ring to include or not IMAC 420 or PMAC 421 can help locate a malfunction.

Figure 6:
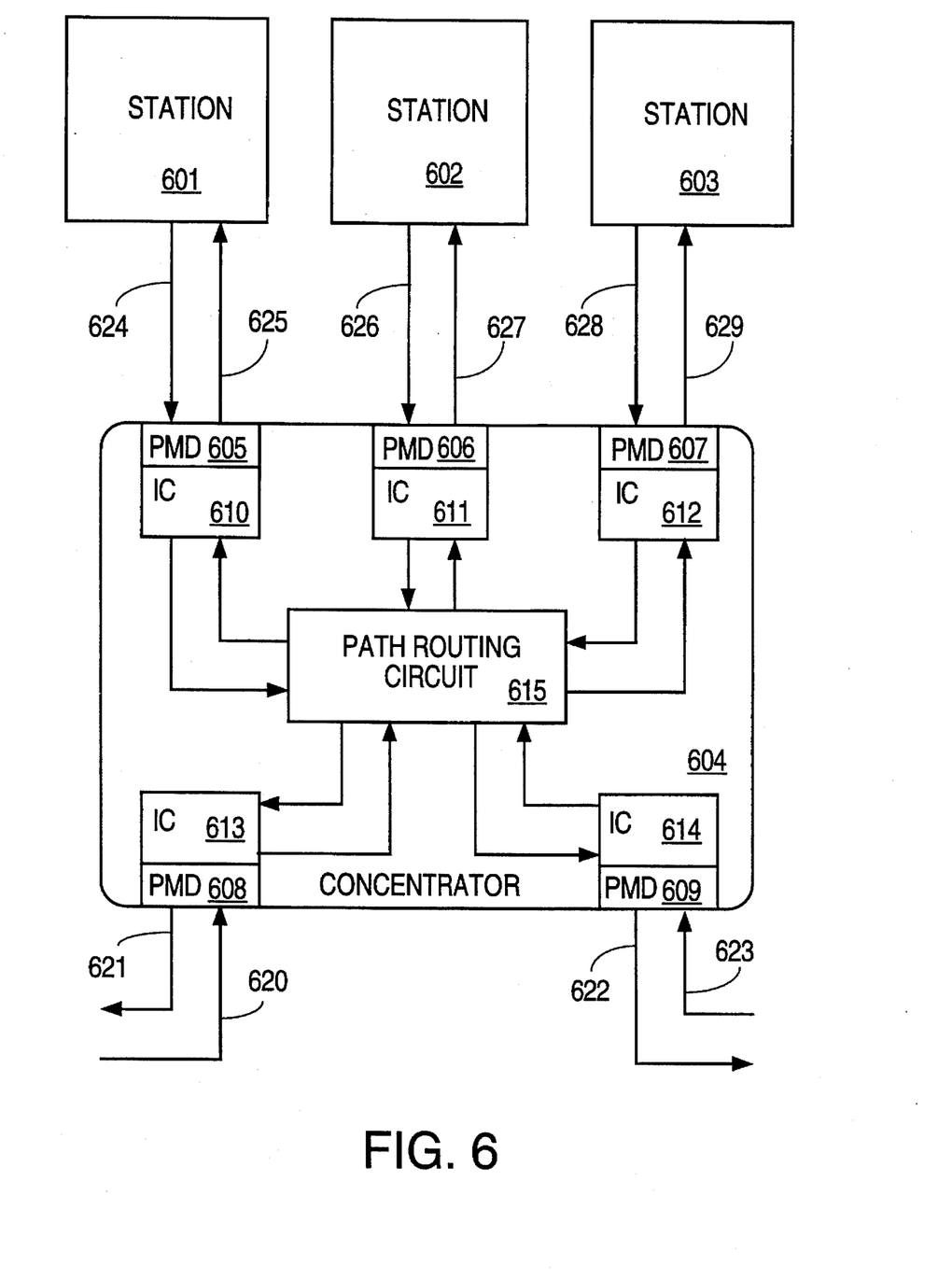
FIG. 6 shows a block diagram of a portion of an FDDI-II ring and a concentrator according to an embodiment of the present invention.

Cycle generator 500 of FIG. 5A and IC 400 of FIG. 4 may also be used to determine if a station connected to a concentrator has hybrid mode capabilities. FIG. 6 shows a concentrator 604 which is connected to a trunk ring (not shown) via fiber optic cables 620–623. Concentrator 604 is also connected to stations 601–603 via fiber optic cables 624–629. A path routing circuit 615 allows concentrator 604 to connect any of the stations 601–603 either to the clockwise or the counterclockwise portion of the trunk ring.

In some applications, a concentrator, such as concentrator 604, may be connected to a ring operating in hybrid mode and a ring operating in basic FDDI packet mode. However, some of the station 601–603 may not be FDDI-II compatible and should not be connected to a hybrid ring. Accordingly, concentrator 604 must determine which stations are capable of hybrid mode operations.

In concentrator 604, PMDs 605–609 provide connections to fiber optic cables 620–629. ICs 610–614 provide PHY and HRC functions and are identical to the IC 400 shown in FIG. 4 and described above. Stations 601–603 can be tested for hybrid mode capability by creating a loopback hybrid ring containing one of IC 610, 611, or 612 and one or more of stations 601, 602, and 603 then using hybrid test mode.

Referring again to FIG. 4, if IC 400 is part of a concentrator and fiber optic cables 414 and 415 are connected to a station, a loopback ring can be created which transmits cycles from a cycle generator in HMUX 403, through configuration switch 404, through transmitter 405, through phaser 401, out to PMD 410, then to the station attached to cable 415, back from the station via cable 414, through PMD 410, through phaser 401, through receiver 402, and finally back to HMUX 403. If test cycles make it around the loopback ring, the station is likely hybrid mode capable and may be connected to a hybrid ring. To further evidence hybrid mode capabilities, errors in the cycle header may be injected, and if the remote station is hybrid mode capable, the error in the cycle header will be changed. For example, if 5-bit value I is injected into the cycle sequence field of a cycle header, the cycle control field will be changed by an HMUX from SS to SR. When detected, this will provide explicit proof of hybrid mode capability. Otherwise, the station should not be connected to a hybrid ring.

Although the present invention has been described with reference to particular embodiments, the description is only an example of the invention's application and should not be taken as a limitation. The scope of the present invention is defined only by the following claims.

We claim:

1. A method for testing hybrid mode operation of elements of an FDDI-II network, comprising the steps of:

creating a loopback ring for testing of hybrid mode operation;

generating hybrid mode cycles using circuitry in a non-monitor station attached to the loopback ring;

transmitting information from the hybrid mode cycles, on the loopback ring; and measuring the progress of the information around the loopback ring.

2. The method of claim 1, wherein the step of creating a loopback ring comprises creating a loopback ring wherein the non-monitor station is the only station that is in the FDDI-II network and attached to the loopback ring.

3. The method of claim 2, wherein the step of creating a loopback ring further comprises:

providing, within the non-monitor station, a loopback circuit, a transmitter, and a receiver; and configuring the loopback circuit to provide output signals from the transmitter as input signals to the receiver.

4. The method of claim 2, wherein the step of creating a loopback ring further comprises:

providing, within the non-monitor station, a latency adjustment buffer which stores data for use in generating hybrid mode cycles; and configuring a loopback circuit to connect the latency adjustment buffer the loopback ring to that information transmitted on the loopback ring is received and stored by the latency adjustment buffer.

5. The method of claim 4, wherein the step of generating hybrid mode cycles comprises:

generating a data byte from the latency adjustment buffer during a time slot appropriate for testing isochronous service of the non-monitor station.

6. The method of claim 5, wherein the latency adjustment buffer has insufficient data storage capacity to store an entire cycle of isochronous data.

7. The method of claim 6, wherein the latency adjustment buffer uses only one byte of storage for isochronous data.

8. The method of claim 2, further comprising:

providing, within the non-monitor station, an IMAC circuit which processes isochronous data from hybrid mode cycles and a PMAC circuit which processes packet data from hybrid mode cycles; and configuring a loopback circuit to connect the IMAC circuit and the PMAC circuit as part of the loopback ring, for testing operation of the IMAC and PMAC circuits.

9. The method of claim 2, wherein the step of creating a loopback ring further comprises providing, within the non-monitor station, a mini-IMAC for generating tag codes which identify slots used for isochronous data used by the station.

10. The method of claim 1, wherein:

the step of generating hybrid mode cycles comprises generating a cycle header with error bytes;

the step of transmitting information, comprises transmitting the cycle header with error bytes; and the step of measuring the progress of the information comprises observing whether the error bytes in the cycle header are corrected during travel around the loopback ring.

11. The method of claim 1, wherein:

the step of generating hybrid mode cycles comprises generating a sequence of cycles having cycle preambles with lengths that are consistently different from a correct length; and the step of measuring the progress of the information comprises observing whether lengths of the cycles are corrected during travel around the loopback ring.

12. The method of claim 1, wherein:

the non-monitor station is a concentrator;

the hybrid operations being tested are the hybrid capabilities of a second station attached to the concentrator; and the step of creating a loopback ring comprises creating a loopback ring which includes the concentrator and the second station.

13. The method of claim 12, wherein:
the concentrator comprises a cycle generator, a loopback circuit, a transmitter, and a PMD unit;
the second station is connected to the PMD unit of the concentrator via fiber optic cable;
the step of generating hybrid mode cycles comprises generating cycles using the cycle generator;
the step of creating a loopback ring further comprises configuring the loopback circuit to route cycles generated by the cycle generator through the transmitter then through the PMD then out on the fiber optic cable to the second station; and
the step of measuring the progress of the information comprises determining if isochronous data signals are returned from the second station to the concentrator.

14. The method of claim 13, wherein the step of generating hybrid mode cycles further comprises generating isochronous data from a value stored in a latency adjustment buffer in the concentrator.

15. The method of claim 14, wherein the latency adjustment buffer has only one byte of storage for isochronous data.

16. The method of claim 15, wherein the step of creating a loopback ring further comprises providing tag codes from a limited IMAC within the cycle generator.

17. A circuit for testing hybrid mode operations of an element of an FDDI-II network, the circuit comprising:
a loopback circuit which is configurable to create a hybrid loopback ring; and
a cycle generator for generating hybrid mode cycles on the hybrid loopback ring, wherein the cycle generator contains a memory which stores one or more data bytes of a hybrid mode cycle and has less information storage capacity than is required to store an entire hybrid mode cycle.

18. The circuit of claim 17, further comprising:
a receiver coupled to the loopback circuit; and
a transmitter coupled to the loopback circuit wherein the loopback circuit is configurable to route cycles from the transmitter to the receiver;
wherein the memory in the cycle generator comprises:
a latency adjustment buffer including memory for storing packet data and memory for storing isochronous data, the latency adjustment buffer providing isochronous data during a selected time slot reserved for isochronous data.

19. The circuit of claim 18, wherein the loopback circuit, the cycle generator, the receiver, the transmitter, and the latency adjustment buffer are part of a single integrated circuit.

20. The circuit of claim 19, wherein the loopback circuit is configurable to create a hybrid ring which includes one or devices external to the integrated circuit.

21. The circuit of claim 18, wherein the latency adjustment buffer is a two-byte buffer.

22. The circuit of claim 17, wherein the cycle generator further comprises logic for generating tag codes wherein the tag codes indicate whether a slot in a cycle contains data that is allocated for processing by an isochronous media access control unit.

23. The circuit of claim 17, wherein the circuit is contained in a non-monitor station, and the loopback circuit is configurable to create a loopback ring which is internal to the non-monitor station.

24. The circuit of claim 23, wherein:
the loopback circuit and the cycle generator are part of a single integrated circuit which is included in a non-monitor station; and
the loopback circuit is configurable to create a loopback ring which is internal to the integrated circuit.

25. The circuit of claim 17, further comprising:
a concentrator port which contains the loopback circuit and the cycle generator;
a station attached to the concentrator port; and
means for coupling the loopback circuit to the station, wherein the loopback circuit is configurable to create a loopback ring which includes the station.

26. The circuit of claim 25, further comprising means for injecting errors into cycles generated by the cycle generator, wherein the circuit determines whether the station is capable of hybrid mode operation by sending cycles containing errors and then observing the stations response to the errors.

27. The circuit of claim 17, wherein the cycle generator comprises:
a latency adjustment buffer which delays isochronous data until a selected time slot in a generated cycle, the latency adjustment buffer having less storage capacity than is needed to store the isochronous data contained in an entire cycle; and
a first isochronous media access control unit which generates a tag code that indicates whether the isochronous data should be processed by a second isochronous media access control unit.

28. The circuit of claim 17, wherein the cycle generator comprises means for changing the duration of generated cycles.

29. The circuit of claim 28, wherein the means for changing duration comprises means for setting the number of bytes in a cycle preamble, wherein the circuit tests hybrid mode operations by setting the number of bytes in a cycle preamble to an incorrect value and determining if the duration of the cycle is corrected by elements on a loopback ring created by the loopback circuit.

30. A non-monitor station for use in an FDDI-II network, comprising:
a loopback circuit which is configurable to create a hybrid loopback ring; and
a cycle generator for generating hybrid mode cycles on the hybrid loopback ring.

31. The non-monitor station of claim 30, wherein the cycle generator comprises:
a latency adjustment buffer having less storage capacity than is needed to store the isochronous data contained in an entire hybrid mode cycle; and
an isochronous media access control unit which generates tag codes which indicate time slots that are reserved for isochronous data.

32. An HMUX circuit which controls routing of packet data and isochronous data to one or more media access control units in a station in an FDDI-II network, the HMUX circuit comprising an isochronous media access control unit that generates tag codes to indicate time slots that are reserved for isochronous data.

33. The HMUX circuit of claim 32, further comprising:
a start register;
a stop register; and
a WBC open register,
wherein for a time slot containing the Nth data byte of a WBC which a value in the WBC open register indicates is open, the isochronous media access control unit in the HMUX circuit generates a tag code indicating that the time slot is reserved for isochronous data and contains a data byte to be processed by a second isochronous media access control unit, wherein N is an integer between a value in the start register and a value in the stop register.

* * * * *

UNITED STATES PATENT AND TRADEMARK OFFICE
CERTIFICATE OF CORRECTION

PATENT NO.   :   5,465,250
DATED        :   November 7, 1995
INVENTOR     :   David C. Brief It is certified that error appears in the above-identified patent and that said Letters Patent is hereby corrected as shown below:

Column 3, line 54:
    Delete "station" and insert --stations--

Column 6, line 40:
    After "range" insert --of--

Column 6, line 49:
    After "multiplexer" insert --511--

Column 11, line 57:
    Before "devices" insert --more--

Signed and Sealed this

Twenty-seventh Day of August, 1996

Attest:

BRUCE LEHMAN

Attesting Officer

Commissioner of Patents and Trademarks